(12) United States Patent
Shelton

(10) Patent No.: US 8,909,669 B2
(45) Date of Patent: Dec. 9, 2014

(54) SYSTEM AND METHOD FOR LOCATING AND RETRIEVING PRIVATE INFORMATION ON A NETWORK

(75) Inventor: Robert Shelton, Irvine, CA (US)

(73) Assignee: Private Access, Inc., Irvine, CA (US)

( * ) Notice: Subject to any disclaimer, the term of this patent is extended or adjusted under 35 U.S.C. 154(b) by 831 days.

(21) Appl. No.: 13/075,313

(22) Filed: Mar. 30, 2011

(65) Prior Publication Data

US 2011/0246475 A1    Oct. 6, 2011

Related U.S. Application Data

(60) Provisional application No. 61/318,866, filed on Mar. 30, 2010.

(51) Int. Cl.
*G06F 17/30* (2006.01)
*G06F 21/62* (2013.01)

(52) U.S. Cl.
CPC ................................. *G06F 21/6245* (2013.01)
USPC ........... 707/770; 707/722; 707/736; 707/758; 707/781; 713/182; 726/2; 726/27

(58) Field of Classification Search
None
See application file for complete search history.

(56) References Cited

U.S. PATENT DOCUMENTS

| | | | | |
|---|---|---|---|---|
| 7,409,406 B2 * | 8/2008 | Agrawal et al. | ............... | 707/742 |
| 7,444,413 B2 * | 10/2008 | Saxena | ........................... | 709/229 |
| 7,711,727 B2 * | 5/2010 | Agrawal et al. | ............... | 707/711 |
| 7,970,791 B2 * | 6/2011 | Liao et al. | ..................... | 707/791 |
| 8,214,394 B2 * | 7/2012 | Krishnaprasad et al. | ..... | 707/781 |
| 8,239,414 B2 * | 8/2012 | Liao et al. | ..................... | 707/791 |
| 8,275,632 B2 * | 9/2012 | Awaraji et al. | .................... | 705/2 |
| 8,332,430 B2 * | 12/2012 | Koide et al. | ................... | 707/783 |
| 8,589,183 B2 * | 11/2013 | Awaraji et al. | ................... | 705/2 |
| 8,595,255 B2 * | 11/2013 | Krishnaprasad et al. | ..... | 707/781 |
| 2002/0120858 A1 * | 8/2002 | Porter et al. | .................. | 713/200 |
| 2004/0024886 A1 * | 2/2004 | Saxena | ......................... | 709/229 |
| 2005/0055327 A1 * | 3/2005 | Agrawal et al. | .................. | 707/1 |
| 2006/0026042 A1 * | 2/2006 | Awaraji et al. | .................... | 705/3 |
| 2006/0294251 A1 * | 12/2006 | Cocotis et al. | ................ | 709/229 |
| 2008/0183703 A1 * | 7/2008 | Agrawal et al. | ................... | 707/5 |
| 2009/0106271 A1 * | 4/2009 | Chieu et al. | ................... | 707/100 |
| 2010/0125605 A1 * | 5/2010 | Nair et al. | ..................... | 707/784 |
| 2011/0246443 A1 * | 10/2011 | Bhatkar et al. | ................ | 707/709 |
| 2012/0117665 A1 * | 5/2012 | Borden et al. | .................. | 726/30 |
| 2012/0272304 A1 * | 10/2012 | Liao et al. | .......................... | 726/6 |
| 2012/0278303 A1 * | 11/2012 | Krishnaprasad et al. | ..... | 707/711 |
| 2013/0173582 A1 * | 7/2013 | Liao et al. | ..................... | 707/709 |
| 2013/0185332 A1 * | 7/2013 | Koide et al. | ................... | 707/783 |
| 2013/0311459 A1 * | 11/2013 | Koide et al. | ................... | 707/723 |
| 2014/0046978 A1 * | 2/2014 | Krishnaprasad et al. | ..... | 707/781 |

* cited by examiner

*Primary Examiner* — Hung Le
(74) *Attorney, Agent, or Firm* — John C. Serio; Burns & Levinson LLP

(57) ABSTRACT

A system for document retrieval in a network environment is provided where documents are stored with corresponding privacy codes. A query server computer is in communication with the network and is programmed to generate a privacy index of all documents available on the network indexed by their corresponding privacy codes. The privacy codes define document access permissions that are securely associated with the documents and are assigned by document custodians. A search engine in communication with the network is configured to receive a query from a requester and generate a list of documents from the privacy index which match search parameters of the query and privacy codes of the requester.

14 Claims, 4 Drawing Sheets

FIRST INDEX

_100_

| PRIMARY CODE | DOC. ID/URL |
|---|---|
| 0000...0001 *102* | |
| 0000...0001 | http://www.names.com/5763 |
| 0000...0001 | http://registry.rmv.gov/myreg.html ——— 104 |
| 0000...0001 | http://phonebook.local.org/smith |
| | http://widgetstore.sales.com/nov |
| . | . |
| . | . |
| . | . |
| 9999...9999 | ftp://hospitals.ctp/pharma/3723 |
| 9999...9999 | http://umass.org/healthcare/smith377 |
| 9999...9999 | http://ca.gov/sf-parking/rev09 |

FIG. 1

SECOND INDEX 200

| WORD (202) | DOC ID/URL (204) |
|---|---|
| Aaron | http://smithrec/pharmacy |
| Aaron | http://smithrec/radiology |
| Aaron | http://cityhospital.org/admissions/smith073 |
| Aaron | http://cityhosp.org/abpos/chem/3472 |
| . | . |
| . | . |
| . | . |
| Zoo | http:/vet.org/ct/contacts/local/33116 |
| Zoo | http:/cityhosp.org/donors/west/rec7302 |
| Zoo | http:/phonebook.org/listing/public/9997 |

FIG. 2

SYSTEM AND METHOD FOR LOCATING AND RETRIEVING PRIVATE INFORMATION ON A NETWORK

CROSS REFERENCE TO RELATED APPLICATIONS

This application claims benefit of U.S. Provisional Application No. 61/318,866 filed on Mar. 30, 2010.

FIELD OF THE INVENTION

The invention relates to document retrieval and in particular to access control for documents having configurable privacy attributes.

BACKGROUND OF THE INVENTION

Information is commonly received from innumerable databases over computer networks such as the Internet by using one or more well known search engines or query servers such as the Google® search engine by Google, Inc. of Mountain View Calif. Search engines generally employ various systems and algorithms in response to a user query having one or more search terms to generate a hit list of documents including relevant instances of the search terms. The hit list typically includes uniform resource locaters (URLs), (i.e., web addresses) of the found documents.

A typical search engine uses a proprietary index associating every word in the documents being searched with a URL or pointer to the document in which the word is found. The proprietary index is automatically generated with a web crawler. In an illustrative search for a document in response to a query having a plurality of search terms, a search engine first accesses the index to generate a list of URLs associated with a first search term then narrows the list of URLs by successively searching for members of the list which are also associated with a second search term in the index, etc.

Search engines have also been employed to control access codes associated with the documents. For example, a search engine may maintain a list of users and their corresponding access code or credentials. Before providing a hit list to a user, the search engine checks the requester's access code on the list and removes from the hit list any URLs for documents for which the requester's access code does not meet the document's authorized access code.

Previously known search engines have maintained the user access code list on a query server or, with improved efficiencies, on a local web server, as in U.S. Pat. No. 7,031,954. Only after the processing involved in generating a hit list is complete, however, do such search engines compare access codes of found documents with searcher's access code. The generation of a preliminary hit list including documents which can not be delivered to the searcher or included on a delivered hit list can be wasteful of processing and storage resources.

SUMMARY OF THE INVENTION

Illustrative embodiments of the present invention provide a system and method for controlling access to documents using access control parameters to reduce preliminary search engine hit lists prior to searching the preliminary search hit list for subsequent search terms in a query.

An illustrative embodiment of the invention provides a method of document retrieval in a network environment where documents are stored with a plurality of access codes. The method includes the steps of receiving a query by a query server having access to a first index of words in documents available for searching on document servers in the network and corresponding access codes of the documents. The query includes at least one keyword and an access code identifier of a requester. The method further includes the steps of executing the query by the query server whereby the query server identifies a second index of words in the first index from documents having access codes corresponding to the access code identifier. Documents associated with the at least one keyword in the second index are identified.

In the illustrative embodiment, a hit list of the documents identified by the query server including the at least on keyword in response to the searching can be generated. The first index also includes a URL corresponding to each of the documents and the hit list includes URLs of the identified documents. The first index can further include an alias for a URL corresponding to each of the documents. The hit list is generated by identifying URLs of the identified documents in a third index of the aliases and corresponding URLs. The hit list includes URLs of the identified documents.

Another illustrative embodiment of the invention provides a method of document retrieval in a network environment where documents are stored with corresponding privacy codes. The privacy codes are privately controllable by at least one document custodian. The method includes the steps of receiving a query by at least one query server having access to a first index of documents available for searching on document servers in the network and privacy codes associated with corresponding documents in the index. The query includes or is otherwise associated with an access level identifier of a requester. The access level identifier indicates particular privacy codes of documents authorized for viewing by the requester. A first list of documents corresponding to the particular privacy codes indicated by the requester's access level identifier is generated by the query server in response to the query.

The query typically includes at least one keyword for identifying requested documents. A second index of words in each document in the first list is generated by the query server. A second list of the documents corresponding to the at least one keyword and being included in the first list is generated by the query server in response to the query. The first index and/or the second index can include a URL corresponding to each of the indexed documents.

In an illustrative embodiment, a list of hyperlinks to the documents in the second list is returned to the requester by the query server. A secure interface is provided for setting privacy codes by authorized document custodians of each document. The first index of documents is updated by the query server to include new documents received by the document server and documents having revised privacy codes.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1 is a listing illustrating a privacy index generated according to an illustrative embodiment of the present invention;

FIG. 2 is a listing illustrating a word index utilized in various illustrative embodiments of the present invention;

DETAILED DESCRIPTION

Figure 3:
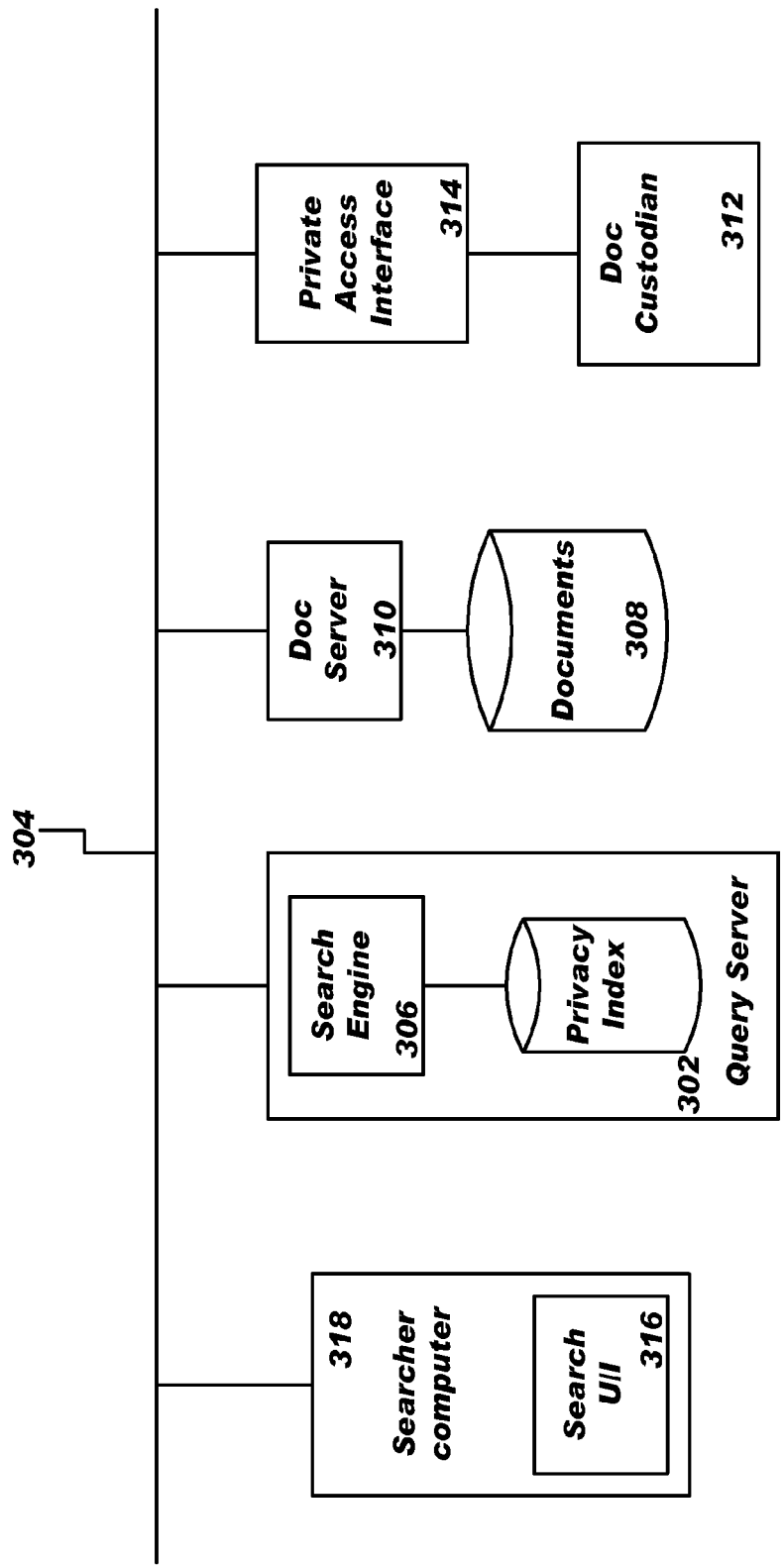
FIG. 3 is a system block diagram illustrating a system for locating and retrieving private information on a network according to an illustrative embodiment of the invention.

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the present invention.

The present invention provides a system and method by which document custodians including private citizens, corporations and institutions can control access to certain documents while allowing authorized persons to search for and access the controlled documents over networks such as the Internet. A search engine is provided which first narrows the universe of searched documents to only those documents which are authorized for viewing by the requester to generate a first list of documents. Once the search is narrowed, a conventional search, such as a keyword search, can be performed on the first list of documents to provide the searcher with the particular private documents of interest.

An illustrative embodiment of the invention utilizes a private access user interface to assign privacy codes to documents containing private information. An example of such a user interface is described in U.S. patent application Ser. No. 12/031,987. By using a private access system, a user can specify one or more parties or groups who are authorized to view particular documents. In an illustrative embodiment, different access levels may be provided by different parties, for example whereby certain parties may have authorization to view/print/forward or change a document while others may have a time limited period for viewing with no printing rights. In an illustrative embodiment, a requester's proximity to a particular station may influence the requester's access code, so that, for example, a requester in a particular location may be authorized to print a document but may not be authorized to do so from another location. Any number of combinations of access levels can be encoded into a particular privacy code which is associated with the document. The custodian or authorized persons can change the privacy codes of a document by securely accessing a private access interface. Encoding of the various access levels to generate a privacy code may be accomplished using any number of encoding methods and/or compression methods as known in the art, for example.

Searching efficiency is greatly enhanced by first narrowing the universe of searchable documents to those that are authorized for viewing or accessing by the searcher/requester. A search engine according to an illustrative embodiment of the invention is described with reference to FIG. 1. The search engine uses a first index 100 to generate a first list of all documents associated with one or more particular privacy codes 102. The first index is a large scale index which is generated and updated automatically using web crawler applications, for example. The first index may include a high percentage of all documents available on a network such as the internet, for example. For every privacy code 102, the corresponding documents 104 having that privacy code is included in the first index 100. The documents are represented in FIG. 1 by their URL, however they may be represented by numerous other document identifiers, aliases, pointers or the like within the scope of the present invention.

The search engine includes a query server which receives a query from a requester. The query generally includes at least one search term such as a keyword or other search parameter along with the privacy codes associated with the requester. In illustrative embodiments, the privacy code may be incorporated with the search parameter, or may be automatically transmitted by the requester in response to preliminary requester identification steps. It should be understood that requester identification may be performed using the private access user interface, or by using any of a variety of well known secure identification methods for remotely certifying the identification and private access codes of a user.

A first list of accessible documents for the particular requester, or the particular requesting condition is generated by identifying all of the documents in the first index associated with the requester's privacy code or codes.

In the illustrative embodiment, the search engine generates a second index 200 as shown in FIG. 2, which associates every word in the documents found in the first list of accessible documents with the document in which the word was found. The second index 200 includes a list of words 202 and a list of document identifiers 204 for documents in the first list of accessible documents corresponding to each word. The search engine then parses the second index 200 using the keyword or search parameter provided in the query to generate a second list of documents which include the keyword. It should be understood that documents having any combination of keywords or search parameters can be found in the second index using traditional data searching methods.

In an alternative embodiment which may be employed, for example, if the quantity of data in the documents listed in the first list of accessible documents is relatively small, the generation of a second index may be omitted in favor or performing a brute force search for documents in the first list containing the search terms or matching the search parameters. This would include comparing each document in the relatively short first list with the query parameters to generate a hit list, rather than generating a word index from the first list.

In another alternative embodiment, a privacy code index, such as the first index 100 shown in FIG. 1, can be generated for a list of documents returned by one or more preliminary search operations. For example, a keyword search may be performed using conventional search techniques on a large scale document index, such as that used by the well known Google® search engine to generate a first list. This illustrative embodiment of the present invention can generate a privacy code index of only the documents included in the first index. Documents matching the privacy codes of a requester are then identified and either provided to the searcher in a hit list or provided to further iterations of searching for keywords or other search parameters.

An illustrative embodiment of the invention is described with reference to FIG. 3 in which a private document query server 302 is in communication with one or more networks 304 such as the internet or intranets, for example. The private document query server 302 includes a privacy search engine 306. Documents having privacy codes are stored on various storage systems 308 which may be widely distributed and can be accessed by document servers 310, via the internet 304 for example. Document custodians 312 control the privacy codes of their documents via private access interface 314. A search user interface 316 executes on a searcher computer, which may be a personal computer or other general purpose computer attached to the network 304, for example.

Figure 4:
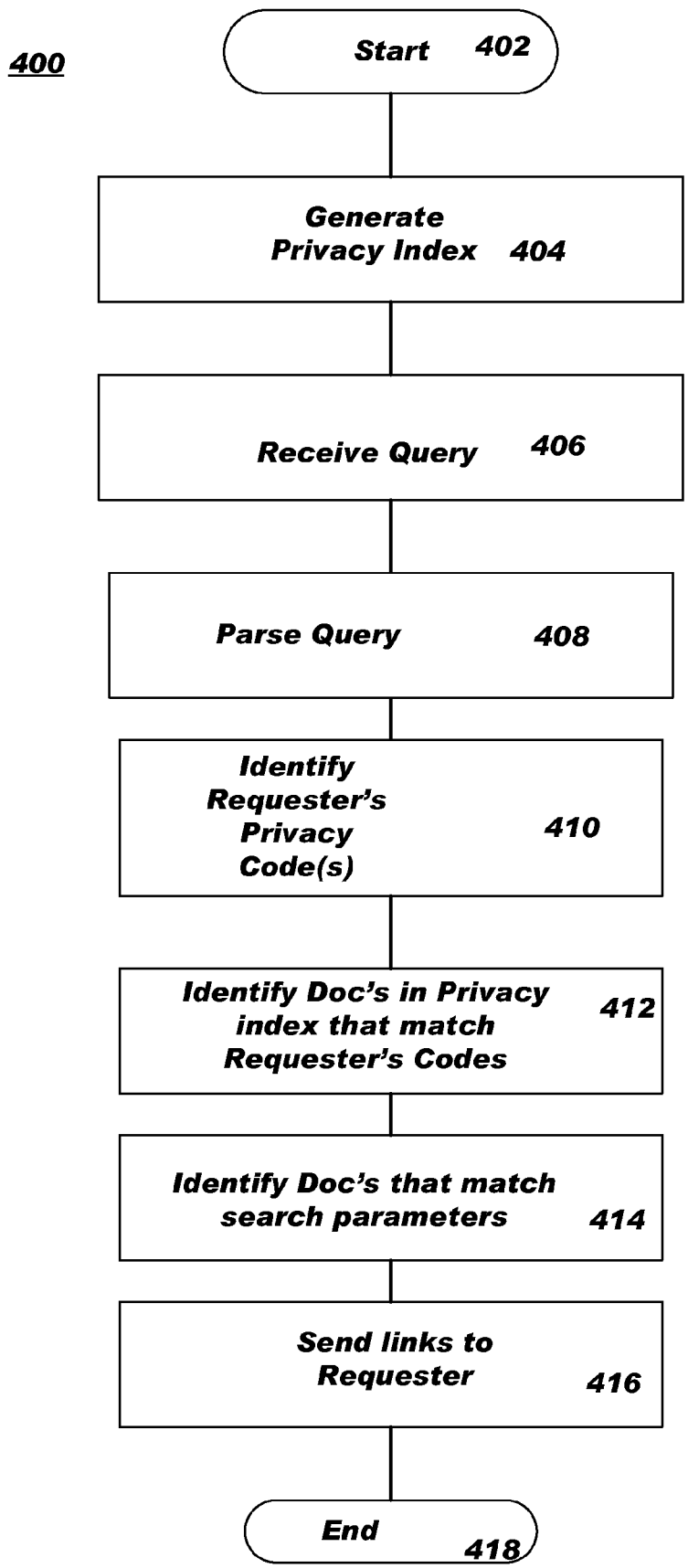
FIG. 4 is a process flow diagram illustrating the steps of retrieving private information according to an illustrative embodiment of the invention.

A method for searching for private information according to an illustrative embodiment is described with reference to the process flow diagram in FIG. 4. A method of document retrieval 400 in a network environment starts in step 402. A privacy index of all privacy codes of documents available for searching on the network indexed to the corresponding documents is generated by a search engine 404. A query is received 406 by a query server having access to the privacy index of documents available for searching on the network, along with privacy codes of the document requester. The query server parses the query 408 and identifies the privacy codes 410 of the requester. The query server identifies 412 documents in the privacy index that match the requester's codes. The query server then identifies 414 documents of the documents identified as matching the requester's codes which also match the search parameters provided in the search query. A list of hyperlinks to the resulting documents is communicated to the requester. The illustrative method ends at process step 418.

While the invention has been described and illustrated in connection with preferred embodiments, many variations and modifications will be evident to those skilled in the art and may be made without departing from the spirit and scope of the invention. The invention is thus not to be limited to the precise details of methodology or construction set forth above as such variations and modification are intended to be included within the scope of the invention.

What is claimed is:

1. A method of document retrieval in a network environment where documents are stored with a plurality of access codes comprising:

receiving a query by a query server having access to a first index of words in documents available for searching on document servers in said network and corresponding access codes of said documents, said query including a keyword and being associated with an access code identifier of a requester, said first index comprises a URL corresponding to each of said documents and said first index further comprises an alias for a URL corresponding to each of said documents;

executing said query by said query server identifying a second index of words in said first index from documents having access codes corresponding to said access code identifier, and identifying documents associated with said at least one keyword in said second index; and generating a hit list of said documents identified by said query server including said at least one keyboard in response to said searching wherein said hit list includes URLs of said identified documents and further identifying URLs of said identified documents in a third index of said aliases and corresponding URLs.

2. The method of claim 1 wherein said access codes are privately controllable by at least one document custodian.

3. A method of document retrieval in a network environment where documents are stored with corresponding privacy codes comprising:

receiving a query by at least one query server having access to a first index of documents available for searching on document servers in said network and privacy codes associated with corresponding documents in said index; said query being associated with an access level identifier of a requester, said access level identifier indicating particular privacy codes of documents authorized for viewing by said requester, wherein said access codes are privately controllable by at least one document custodian;

generating by said query server in response to said query, a first list of said documents corresponding to said particular privacy codes indicated by said requester's access level identifier;

generating a second index of words in each document in said first list by said query server; and generating by said query in response to said query, a second list of said documents corresponding to said at least one keyword and being included in said first list.

4. The method of claim 3, further comprising:

returning to said requester by said query server, a list of hyperlinks to said documents in said second list.

5. The method of claim 3, comprising:

providing a secure interface for setting privacy codes by authorized document custodians of each document.

6. The method of claim 3, comprising:

receiving new documents having a privacy code or a document having a revised privacy code by said document server; and updating by said query server said first index of documents to include said new document or said revised privacy code in response to receiving said new document or said revised privacy code.

7. The method of claim 3, wherein at least one of said first index or second index comprises a URL corresponding to each of said documents and wherein at least one of said first list and said second list includes URLs of said documents included therein.

8. The method of claim 3 wherein said access levels are privately controllable by at least one document custodian.

9. A system for document retrieval in a network environment where documents are stored with corresponding privacy codes, comprising:

a query server computer in communication with the network, the query server computer configured to receive a query including a keyword and an access code identifier from a requester and generate a second index of words in the privacy index from documents having access codes corresponding to the access code identifier; and generate a privacy index of all documents available on the network indexed by their corresponding privacy codes, the privacy codes defining permitted conditions of document access that are securely associated with the documents according to the control of at least one document custodian for each document.

10. The system according to claim 9, comprising:

a search engine in communication with the network and configured to:

receive a query from a requester; and generate a list of documents from said privacy index which match search parameters of the query and privacy codes of the requester.

11. The system according to claim 9 wherein the query server computer is further configured to identify documents associated with the keyword in the second index.

12. The system according to claim 11 wherein the query server computer is further configured to generate a hit list of the identified documents associated with the keyword and associated with the access code identifier.

13. The system according to claim 12 wherein the query server computer is further configured to return to the requester the hit list.

14. The system according to claim 13 wherein the query server computer is further configured to return to the requester a list of hyperlinks to the documents in the hit list.

* * * * *

UNITED STATES PATENT AND TRADEMARK OFFICE
CERTIFICATE OF CORRECTION

| | | |
|---|---|---|
| PATENT NO. | : 8,909,669 B2 | Page 1 of 1 |
| APPLICATION NO. | : 13/075313 | |
| DATED | : December 9, 2014 | |
| INVENTOR(S) | : Shelton | |

It is certified that error appears in the above-identified patent and that said Letters Patent is hereby corrected as shown below:

In the Claim

Column 5, line 43, Claim 1, the portion of the line reading "query server including said at least one keyboard in" should read --query server including said at least one keyword in--

Signed and Sealed this
Seventh Day of April, 2015

Michelle K. Lee
*Director of the United States Patent and Trademark Office*